(12) United States Patent
Ogihara et al.

(10) Patent No.: US 11,971,724 B2
(45) Date of Patent: Apr. 30, 2024

(54) UNMANNED VEHICLE CONTROL SYSTEM, AND UNMANNED VEHICLE CONTROL METHOD

(71) Applicant: Komatsu Ltd., Tokyo (JP)

(72) Inventors: Masanori Ogihara, Tokyo (JP); Misato Maeda, Tokyo (JP); Katsuki Awamori, Tokyo (JP)

(73) Assignee: Komatsu Ltd., Tokyo (JP)

( * ) Notice: Subject to any disclaimer, the term of this patent is extended or adjusted under 35 U.S.C. 154(b) by 195 days.

(21) Appl. No.: 17/415,261

(22) PCT Filed: Jan. 30, 2020

(86) PCT No.: PCT/JP2020/003545
§ 371 (c)(1),
(2) Date: Jun. 17, 2021

(87) PCT Pub. No.: WO2020/158899
PCT Pub. Date: Aug. 6, 2020

(65) Prior Publication Data
US 2022/0057805 A1  Feb. 24, 2022

(30) Foreign Application Priority Data
Feb. 1, 2019  (JP) .................................. 2019-017391

(51) Int. Cl.
*G05D 1/02* (2020.01)
*G05D 1/00* (2006.01)

(52) U.S. Cl.
CPC ......... *G05D 1/0223* (2013.01); *G05D 1/0088* (2013.01); *G05D 1/0094* (2013.01); *G05D 2201/021* (2013.01)

(58) Field of Classification Search
CPC .. G05D 1/0223; G05D 1/0088; G05D 1/0094; G05D 2201/021
USPC .......................................................... 701/23
See application file for complete search history.

(56) References Cited

U.S. PATENT DOCUMENTS

| 5,990,800 A | 11/1999 | Tamaki et al. |
| 2012/0138734 A1* | 6/2012 | Hissong ................ B64C 25/405 244/50 |
| 2017/0058922 A1* | 3/2017 | Kenkel ............... F15B 21/0427 |
| 2019/0163192 A1 | 5/2019 | Takeda et al. |

(Continued)

FOREIGN PATENT DOCUMENTS

| JP | 2005-337332 A | 12/2005 |
| JP | 2012-116467 A | 6/2012 |

(Continued)

OTHER PUBLICATIONS

Office Action dated Jan. 31, 2024, issued in the corresponding Canadian patent application No. 3,124,685.

*Primary Examiner* — Mahmoud S Ismail
(74) *Attorney, Agent, or Firm* — Locke Lord LLP

(57) ABSTRACT

An unmanned vehicle control system includes: a determination unit that determines whether or not to output a heating request for a hydraulic oil based on hydraulic oil data supplied to a hydraulic actuator disposed in an unmanned vehicle and operated by the hydraulic oil; a vehicle receiver that receives a heating command for the hydraulic oil generated based on the heating request; and a heating processor that executes a heating process of the hydraulic oil based on the heating command.

10 Claims, 10 Drawing Sheets

(56) References Cited

U.S. PATENT DOCUMENTS

2019/0241119 A1 8/2019 Takeda et al.
2019/0338793 A1* 11/2019 Uhlman ................ F15B 20/005

FOREIGN PATENT DOCUMENTS

| JP | 2015-102057 A | 6/2015 |
| JP | 2018-49571 A | 3/2018 |
| JP | 2018-49573 A | 3/2018 |

* cited by examiner

UNMANNED VEHICLE CONTROL SYSTEM, AND UNMANNED VEHICLE CONTROL METHOD

FIELD

The present disclosure relates to an unmanned vehicle control system, and an unmanned vehicle control method.

BACKGROUND

The unmanned vehicle may be used on a wide-area work site such as a mine. A travel course for the unmanned vehicle is set on the work site. The unmanned vehicle is controlled to travel according to the travel course.

CITATION LIST

Patent Literature

Patent Literature 1: JP 2005-337332 A

SUMMARY

Technical Problem

When the work site is in a cold region, a temperature of hydraulic oil that operates a hydraulic system decreases. When a viscosity of the hydraulic oil increases as the temperature is lowered, responsiveness of the hydraulic system may decrease. For example, when a steering device of the unmanned vehicle is operated by hydraulic pressure, if the temperature of the hydraulic oil is lowered and the viscosity of the hydraulic oil increases, steering responsiveness of the steering device may decrease. When the steering responsiveness of the steering device decreases, following performance of the unmanned vehicle traveling along the travel course may be reduced.

Solution to Problem

According to an aspect of the present invention, an unmanned vehicle control system comprises: a determination unit that determines whether or not to output a heating request for a hydraulic oil based on hydraulic oil data supplied to a hydraulic actuator disposed in an unmanned vehicle and operated by the hydraulic oil; a vehicle receiver that receives a heating command for the hydraulic oil generated based on the heating request; and a heating processor that executes a heating process of the hydraulic oil based on the heating command.

Advantageous Effects of Invention

According to an aspect of the present invention, it is possible to suppress a decrease in following performance of the unmanned vehicle traveling along the travel course.

DESCRIPTION OF EMBODIMENTS

Hereinafter, embodiments according to the present disclosure will be described with reference to the drawings, but the present invention is not limited thereto. Components of the embodiments described below can be combined as appropriate. In addition, some components may not be used.

First Embodiment

[Control System]

Figure 1:
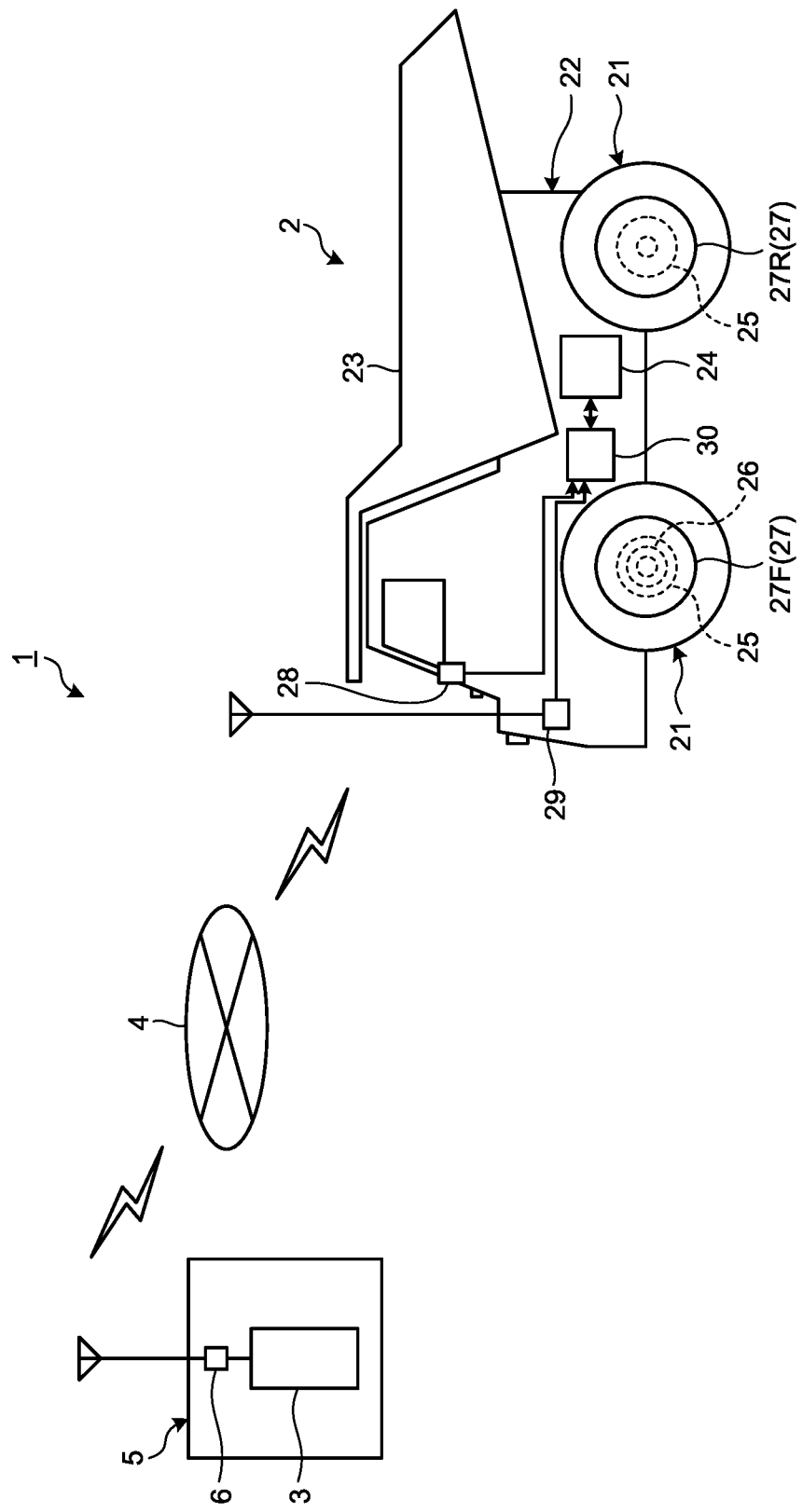
FIG. 1 is a diagram schematically illustrating an example of a control system and an unmanned vehicle according to a first embodiment.

FIG. 1 is a diagram schematically illustrating an example of a control system 1 and an unmanned vehicle 2 according to the present embodiment. The unmanned vehicle 2 refers to a vehicle that travels unmanned without being driven by a driver. The unmanned vehicle 2 operates at the work site.

The control system 1 includes the unmanned vehicle 2, a management device 3, and a communication system 4. The management device 3 includes a computer system and is installed in, for example, a control facility 5 of a mine. The communication system 4 communicates between the management device 3 and the unmanned vehicle 2. A wireless communication device 6 is connected to the management device 3. The communication system 4 includes the wireless communication device 6. The management device 3 and the unmanned vehicle 2 wirelessly communicate with each other via the communication system 4. The unmanned vehicle 2 travels on the work site based on travel course data from the management device 3.

[Unmanned Vehicle]

The unmanned vehicle 2 includes a traveling device 21, a vehicle body 22 supported by the traveling device 21, a dump body 23 supported by the vehicle body 22, and a control device 30.

The traveling device 21 includes a drive device 24 for driving the traveling device 21, a brake device 25 for braking the traveling device 21, a steering device 26 for adjusting a travel direction, and wheels 27.

The unmanned vehicle 2 self-travels due to rotation of the wheels 27. The wheels 27 include front wheels 27F and rear wheels 27R. Tires are mounted on the wheels 27.

The drive device 24 generates a driving force for accelerating the unmanned vehicle 2. The drive device 24 includes an internal combustion engine such as a diesel engine. The drive device 24 may include an electric motor.

Power generated by the drive device 24 is transmitted to the rear wheels 27R. The brake device 25 generates a braking force for decelerating or stopping the unmanned vehicle 2. The steering device 26 can adjust the travel direction of the unmanned vehicle 2. The travel direction of the unmanned vehicle 2 includes a direction of a front portion of the vehicle body 22. The steering device 26 adjusts the travel direction of the unmanned vehicle 2 by steering the front wheels 27F.

The control device 30 is placed in the unmanned vehicle 2. The control device 30 can communicate with the management device 3 outside the unmanned vehicle 2. The control device 30 outputs an acceleration command for operating the drive device 24, a brake command for operating the brake device 25, and a steering command for operating the steering device 26. The drive device 24 generates the driving force for accelerating the unmanned vehicle 2 based on the acceleration command output from the control device 30. By adjusting an output of the drive device 24, a travel speed of the unmanned vehicle 2 is adjusted. The brake device 25 generates the braking force for decelerating the unmanned vehicle 2 based on the brake command output from the control device 30. The steering device 26 generates a force for changing the direction of the front wheels 27F in order to drive the unmanned vehicle 2 straight or turn it based on the steering command output from the control device 30.

Further, the unmanned vehicle 2 includes a position detection device 28 that detects a position of the unmanned vehicle 2. The position of unmanned vehicle 2 is detected using a global navigation satellite system (GNSS). The global navigation satellite system includes a global positioning system (GPS). The global navigation satellite system detects an absolute position of the unmanned vehicle 2 defined by coordinate data of latitude, longitude, and altitude. The global navigation satellite system detects the position of unmanned vehicle 2 defined in a global coordinate system. The global coordinate system refers to a coordinate system fixed to the earth. The position detection device 28 includes a GNSS receiver and detects the absolute position (coordinates) of the unmanned vehicle 2.

Further, the unmanned vehicle 2 includes a wireless communication device 29. The communication system 4 includes the wireless communication device 29. The wireless communication device 29 can wirelessly communicate with the management device 3.

[Hydraulic System]

Figure 2:
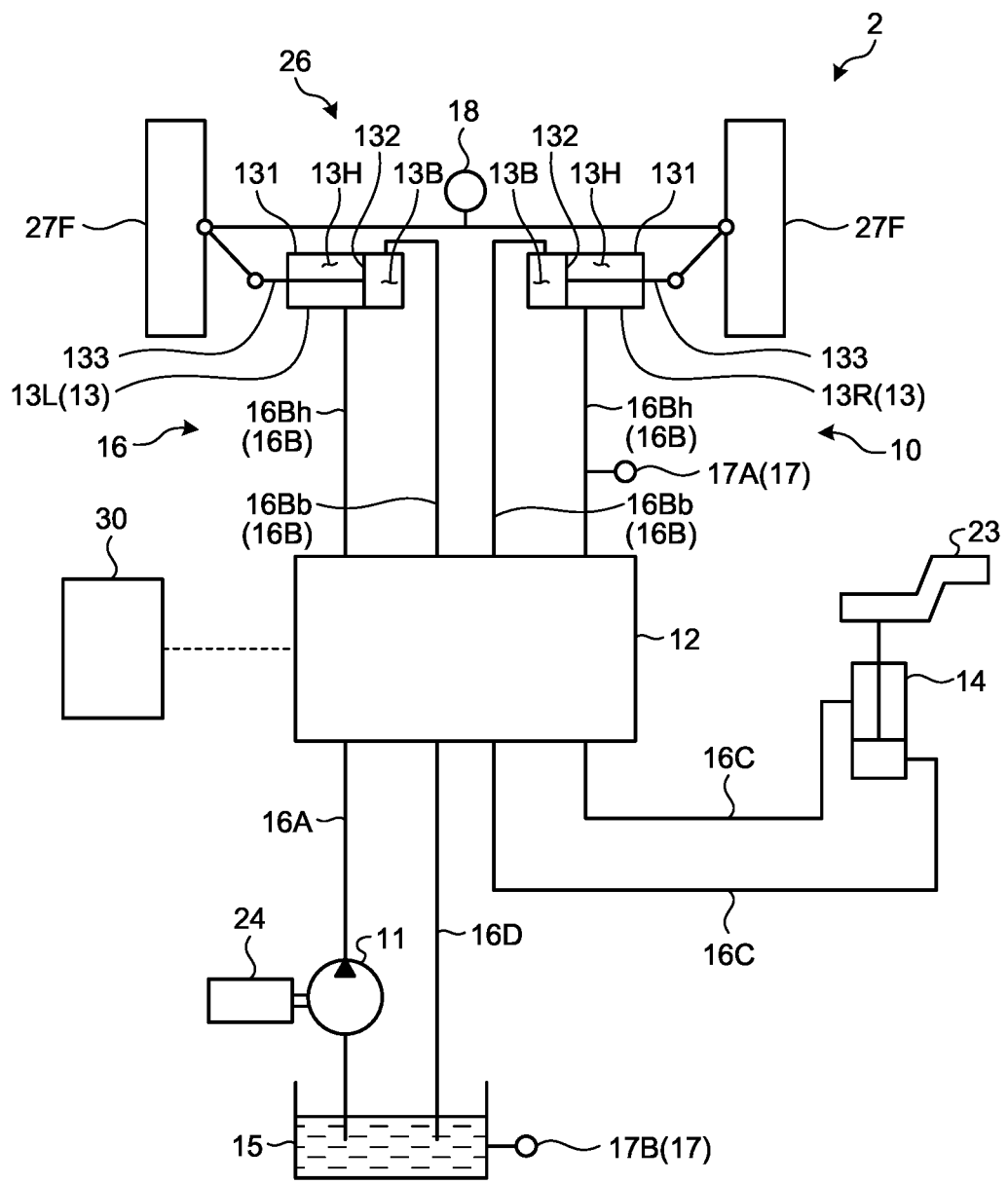
FIG. 2 is a diagram schematically illustrating an example of the unmanned vehicle according to the first embodiment.

FIG. 2 is a diagram schematically illustrating an example of the unmanned vehicle 2 according to the present embodiment. As illustrated in FIG. 2, the unmanned vehicle 2 has a hydraulic system 10.

The hydraulic system 10 has a hydraulic pump 11 operated by the driving force generated by the drive device 24, a valve device 12 connected to the hydraulic pump 11 via a flow path, a first hydraulic actuator 13 operated by hydraulic oil supplied from the hydraulic pump 11, a second hydraulic actuator 14 operated by the hydraulic oil supplied from the hydraulic pump 11, and a hydraulic oil tank 15 for storing the hydraulic oil.

The drive device 24 is a power source for the hydraulic pump 11. The hydraulic pump 11 is the power source for the first hydraulic actuator 13 and the power source for the second hydraulic actuator 14. The hydraulic pump 11 is connected to an output shaft of the drive device 24 and operates by the driving force generated by the drive device 24. The hydraulic pump 11 sucks the hydraulic oil stored in the hydraulic oil tank 15 and discharges it from a discharge port.

The first hydraulic actuator 13 operates the steering device 26. The steering device 26 is operated by the power generated by the first hydraulic actuator 13. The first hydraulic actuator 13 is a hydraulic cylinder. The first hydraulic actuator 13 expands and contracts based on a flow rate of the hydraulic oil. When the first hydraulic actuator 13 expands and contracts, the steering device 26 connected to the first hydraulic actuator 13 operates.

The hydraulic oil discharged from the hydraulic pump 11 is supplied to the first hydraulic actuator 13 via a flow path 16A, the valve device 12, and a flow path 16B. The hydraulic oil flowing out of the first hydraulic actuator 13 is returned to the hydraulic oil tank 15 via the flow path 16B, the valve device 12, and a flow path 16D.

In the following description, the first hydraulic actuator 13 is appropriately referred to as a steering cylinder 13.

The steering cylinder 13 includes a cylinder tube 131 having a bottom, a piston 132 that divides an internal space of the cylinder tube 131 into a bottom chamber 13B and a head chamber 13H, and a rod 133 connected to the piston 132. A flow path 16Bb is connected to the bottom chamber 13B. A flow path 16Bh is connected to the head chamber 13H.

The hydraulic oil discharged from the hydraulic pump 11 is supplied to the bottom chamber 13B via the flow path 16A, the valve device 12, and the flow path 16Bb. When the hydraulic oil is supplied to the bottom chamber 13B, the steering cylinder 13 extends.

Further, the hydraulic oil discharged from the hydraulic pump 11 is supplied to the head chamber 13H via the flow path 16A, the valve device 12, and the flow path 16Bh. When the hydraulic oil is supplied to the head chamber 13H, the steering cylinder 13 contracts.

The front wheel 27F on the left side and the front wheel 27F on the right side are connected to each other via a link mechanism. In the present embodiment, the steering cylinder 13 includes a steering cylinder 13L and a steering cylinder 13R. By an operation of the steering cylinder 13L and the steering cylinder 13R, the left front wheel 27F and the right front wheel 27F, which are connected to each other via the link mechanism, operate in synchronization with each other. Note that the number of steering cylinders 13 may be one.

The second hydraulic actuator 14 operates the dump body 23. The dump body 23 is operated by the power generated by the second hydraulic actuator 14. The second hydraulic actuator 14 is a hydraulic cylinder. The second hydraulic actuator 14 expands and contracts based on the hydraulic oil. As the second hydraulic actuator 14 expands and contracts, the dump body 23 connected to the second hydraulic actuator 14 moves in a vertical direction.

The hydraulic oil discharged from the hydraulic pump 11 is supplied to the second hydraulic actuator 14 via the flow path 16A, the valve device 12, and a flow path 16C. The hydraulic oil flowing out of the second hydraulic actuator 14 is returned to the hydraulic oil tank 15 via the flow path 16C, the valve device 12, and the flow path 16D.

In the following description, the second hydraulic actuator 14 is appropriately referred to as a hoist cylinder 14.

The valve device 12 operates based on an operation command from the control device 30. The valve device 12 can adjust a flow state of the hydraulic oil in a hydraulic circuit 16 connected to each of the steering cylinder 13 and the hoist cylinder 14. The valve device 12 includes a first flow control valve capable of adjusting the flow rate and direction of the hydraulic oil supplied to the steering cylinder 13, and a second flow control valve capable of adjusting the flow rate and direction of the hydraulic oil supplied to the hoist cylinder 14.

Further, the hydraulic circuit 16 is provided with a temperature sensor 17 that detects a temperature of the hydraulic oil to be supplied to the steering cylinder 13. The temperature sensor 17 includes a temperature sensor 17A that detects the temperature of the hydraulic oil in the flow path 16B connected to the steering cylinder 13, and a temperature sensor 17B that detects the temperature of the hydraulic oil in the hydraulic oil tank 15.

Further, the steering device 26 is provided with a steering angle sensor 18 that detects a steering angle of the steering device 26. The steering angle sensor 18 includes, for example, a potentiometer.

[Work Site]

Figure 3:
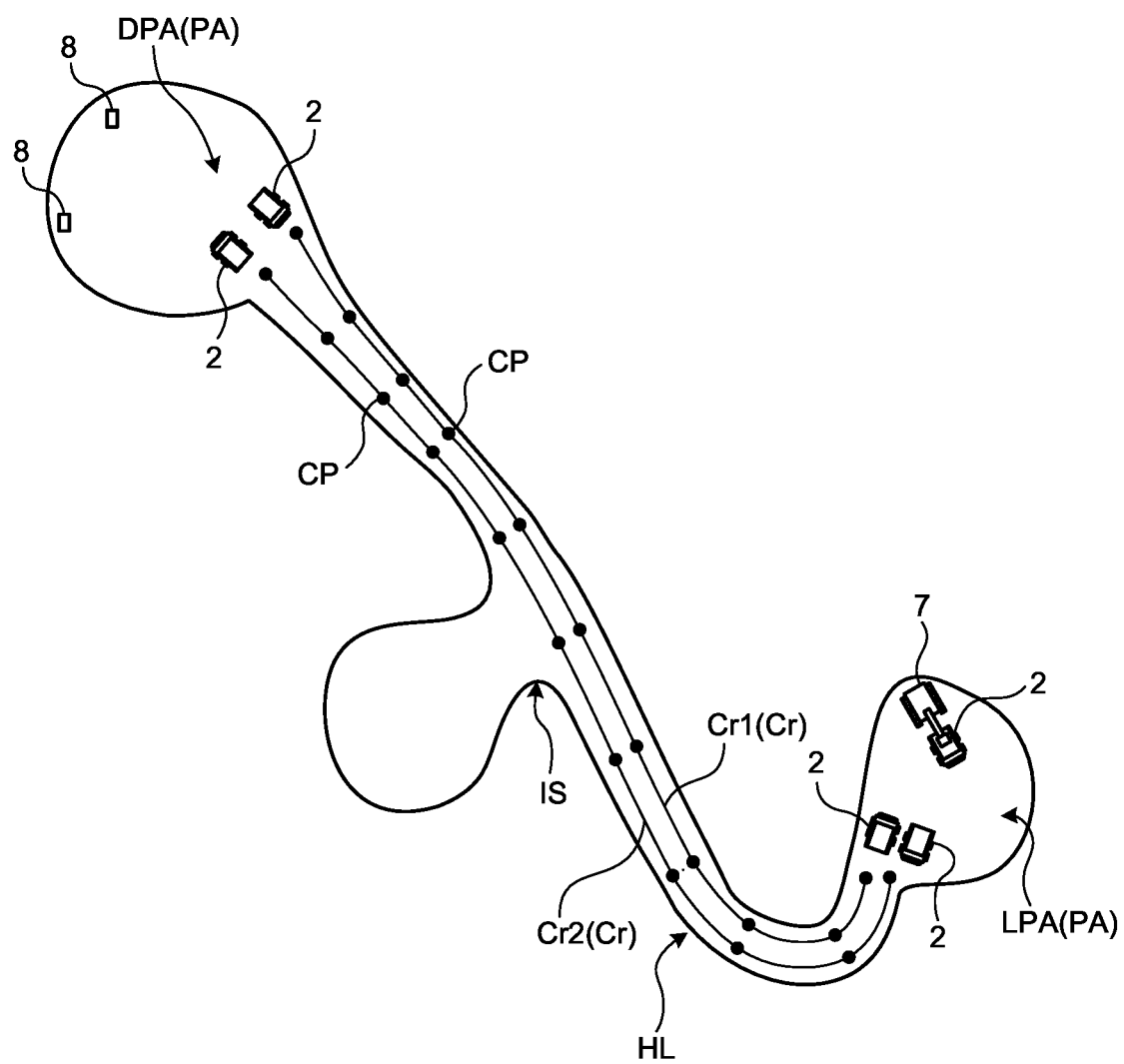
FIG. 3 is a diagram schematically illustrating an example of a work site where the unmanned vehicle according to the first embodiment operates.

FIG. 3 is a diagram schematically illustrating an example of the work site where the unmanned vehicle 2 according to the present embodiment operates. In the present embodiment, the work site is a mine or a quarry, and the unmanned vehicle 2 is a dump truck that travels on the work site and carries a load. The mine refers to a place or a place of business where minerals are mined. Examples of the load carried by the unmanned vehicle 2 include ore or earth and sand excavated in the mine or the quarry.

The unmanned vehicle 2 travels in a work area PA of the mine and at least a part of a travel path HL leading to the work area PA. The work area PA includes at least one of a loading area LPA and an unloading area DPA. The travel path HL includes an intersection IS.

The loading area LPA refers to an area where a loading work of loading the load on the unmanned vehicle 2 is carried out. In the loading area LPA, a loading machine 7 such as an excavator operates. The unloading area DPA refers to an area where a dumping work of dumping the load from the unmanned vehicle 2 is carried out. For example, a crusher 8 is provided in the unloading area DPA.

The unmanned vehicle 2 travels on the work site based on the travel course data indicating travel conditions of the unmanned vehicle 2. As illustrated in FIG. 3, the travel course data includes a plurality of course points CP set at intervals. The course point CP defines a target position of the unmanned vehicle 2. A target travel speed and a target travel direction of the unmanned vehicle 2 are set for each of the plurality of course points CP. In addition, the travel course data includes a travel course Cr indicating a target travel route of the unmanned vehicle 2. The travel course Cr is defined by a line connecting the plurality of course points CP.

The travel course Cr is set on the travel path HL and the work area PA. The unmanned vehicle 2 travels on the travel path HL according to the travel course Cr. The travel course Cr includes a travel course Cr1 and a travel course Cr2. For example, the unmanned vehicle 2 travels from the loading area LPA to the unloading area DPA according to the travel course Cr1, and travels from the unloading area DPA to the loading area LPA according to the travel course Cr2.

The travel course data is generated in the management device 3. The management device 3 transmits the generated travel course data to the control device 30 of the unmanned vehicle 2 via the communication system 4. The control device 30 controls the traveling device 21 so that the unmanned vehicle 2 travels according to the travel course Cr based on the travel course data and travels according to the target travel speed and the target travel direction set for each of the plurality of course points CP.

[Management Device and Control Device]

Figure 4:
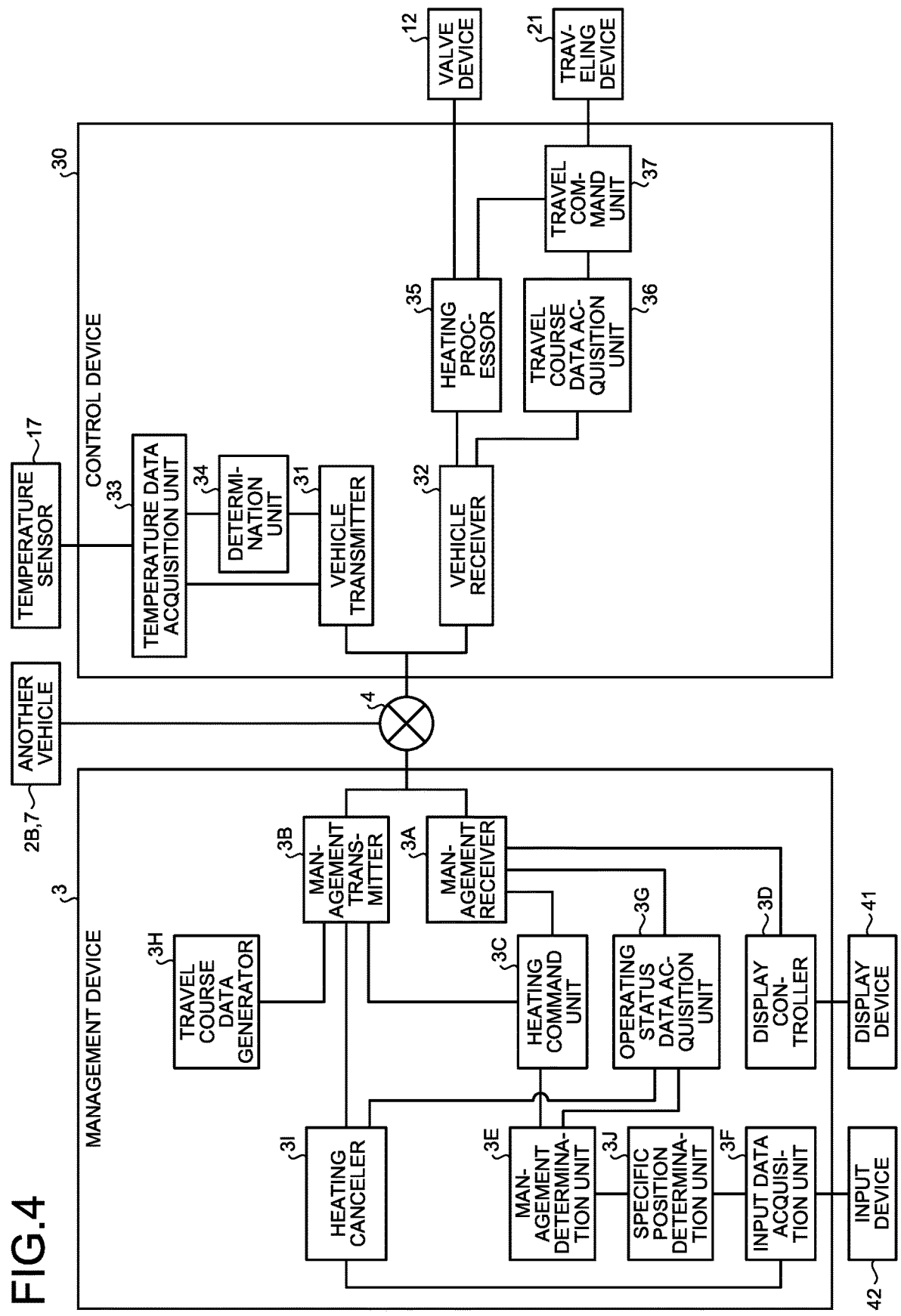
FIG. 4 is a functional block diagram illustrating an example of a management device and a control device according to the first embodiment.

FIG. 4 is a functional block diagram illustrating an example of the management device 3 and the control device 30 according to the present embodiment. The control device 30 can communicate with the management device 3 via the communication system 4.

The management device 3 is connected to each of a display device 41 and an input device 42. There is an administrator in the control facility 5. The display device 41 provides display data to the administrator. The input device 42 is operated by the administrator. As the display device 41, a flat panel display such as a liquid crystal display (LCD) or an organic electroluminescence display (OELD) is exemplified. The management device 3 controls the display device 41. The administrator can see a display screen of the display device 41. As the input device 42, at least one of a computer keyboard, buttons, switches, and a touch panel is exemplified. The administrator can operate the input device 42. The input device 42 generates input data by being operated by the administrator. The input data generated by the input device 42 is output to the management device 3.

In the present disclosure, each of the management device 3 and the control device 30 communicates with another vehicle via the communication system 4. At the work site, a plurality of unmanned vehicles 2 operate. In addition, at the work site, a work vehicle other than the unmanned vehicle 2, such as the loading machine 7, also operates. In addition, at the work site, a manned vehicle that is driven by the driver operates. In the present disclosure, the other vehicle is at least one of another unmanned vehicle 2, the loading machine 7, and the manned vehicle. The management device 3 communicates with each of the plurality of unmanned vehicles 2. The management device 3 communicates with the loading machine 7. The management device 3 communicates with the manned vehicle.

The control device 30 of the unmanned vehicle 2 communicates with the other unmanned vehicle 2 different from the unmanned vehicle 2 on which the control device 30 is mounted. The control device 30 communicates with the loading machine 7. The control device 30 communicates with the manned vehicle.

The management device 3 includes a management receiver 3A, a management transmitter 3B, a heating command unit 3C, a display controller 3D, a management determination unit 3E, an input data acquisition unit 3F, an operating status data acquisition unit 3G, a travel course data generator 3H, a heating canceler 3I, and a specific position determination unit 3J.

The management receiver 3A receives data transmitted from the control device 30 via the communication system 4. In addition, the management receiver 3A receives data transmitted from another vehicle via the communication system 4.

The management receiver 3A receives hydraulic oil data supplied to the steering cylinder 13 from the control device 30. In the present disclosure, the hydraulic oil data includes at least one of the temperature of the hydraulic oil and a waiting time indicating a time while a flow of the hydraulic oil is stopped. In the following description, it is assumed that the hydraulic oil data is the temperature of the hydraulic oil.

The temperature of the hydraulic oil to be supplied to the steering cylinder 13 is detected by the temperature sensor 17. The management receiver 3A receives the temperature of the hydraulic oil detected by the temperature sensor 17 from the control device 30.

Further, the management receiver 3A receives a heating request for the hydraulic oil supplied to the steering cylinder 13 from the control device 30. The control device 30 outputs the heating request for the hydraulic oil based on the temperature of the hydraulic oil detected by the temperature sensor 17. The management receiver 3A receives the heating request transmitted from the control device 30.

The management transmitter 3B transmits the data to the control device 30 via the communication system 4. In addition, the management transmitter 3B transmits the data to another vehicle via the communication system 4.

The management transmitter 3B transmits a heating command for the hydraulic oil to be supplied to the steering cylinder 13 to the control device 30.

The heating command unit 3C outputs the heating command for the hydraulic oil based on the heating request.

The display controller 3D causes the display device 41 to display heating request vehicle data indicating the unmanned vehicle 2 that has output the heating request. As described above, the unmanned vehicle 2 has the position detection device 28. Position data of the unmanned vehicle 2 detected by the position detection device 28 is transmitted to the management device 3. The management device 3 communicates with each of the plurality of unmanned vehicles 2 operating at the work site. The position data of each of the plurality of unmanned vehicles 2 is transmitted to the management device 3. The display controller 3D causes the display device 41 to display image data indicating respective position data of the plurality of unmanned vehicles 2 based on the respective position data of the plurality of unmanned vehicles 2. The position data of the unmanned vehicle 2 includes, for example, a character image of the unmanned vehicle 2. When the position of the unmanned vehicle 2 changes, the character image of the unmanned vehicle 2 moves on the display screen of the display device 41 as the position of the unmanned vehicle 2 changes. The administrator can visually recognize the position of the unmanned vehicle 2 on the work site by looking at the character image.

The display controller 3D displays the unmanned vehicle 2 that outputs the heating request and the unmanned vehicle 2 that does not output the heating request in different display formats. In the present disclosure, the display controller 3D displays the character image of the unmanned vehicle 2 in a first color as heating non-request vehicle data indicating the unmanned vehicle 2 that does not output the heating request. The display controller 3D displays the character image of the unmanned vehicle 2 in a second color different from the first color as the heating request vehicle data indicating the unmanned vehicle 2 that has output the heating request. Thus, the administrator can visually recognize the unmanned vehicle 2 that has output the heating request among the plurality of unmanned vehicles 2 operating at the work site by looking at the display device 41.

Further, the display controller 3D causes the display device 41 to display heating execution vehicle data indicating the unmanned vehicle 2 that executes a heating process of the hydraulic oil based on the heating command output from the heating command unit 3C. Based on the heating request for the hydraulic oil, the heating command unit 3C outputs the heating command to a specific unmanned vehicle 2 that has output the heating request for the hydraulic oil among the plurality of unmanned vehicles 2 operating at the work site. The display controller 3D causes the display device 41 to display the heating execution vehicle data indicating the specific unmanned vehicle 2 to which the heating command is output and which is executing the heating process based on the heating command. The display controller 3D displays the unmanned vehicle 2 that is executing the heating process and the unmanned vehicle 2 that is not executing the heating process in different display formats. In the present disclosure, the display controller 3D displays the character image of the unmanned vehicle 2 in a third color as heating non-execution vehicle data indicating the unmanned vehicle 2 that is not executing the heating process. The display controller 3D displays the character image of the unmanned vehicle 2 in a fourth color different from the third color as the heating execution vehicle data indicating the unmanned vehicle 2 that is executing the heating process. Thus, the administrator can visually recognize the unmanned vehicle 2 that is executing the heating process among the plurality of unmanned vehicles 2 operating at the work site by looking at the display device 41.

Note that the display controller 3D may cause the display device 41 to display the display data that allows the administrator to recognize the unmanned vehicle 2 that is executing the heating process and the unmanned vehicle 2 that is not executing the heating process. The display controller 3D may cause the display device 41 to display the unmanned vehicle 2 that is executing the heating process by the character image of a first shape, and may cause the display device 41 to display the unmanned vehicle 2 that is not executing the heating process by the character image of a second shape different from the first shape.

The management determination unit 3E determines whether the heating process of the hydraulic oil supplied to the steering cylinder 13 is necessary. The heating command unit 3C outputs the heating command when the management determination unit 3E determines that the hydraulic oil needs to be heated.

The input data acquisition unit 3F acquires the input data generated by operating the input device 42. The management determination unit 3E determines whether the heating process is necessary based on the input data acquired by the input data acquisition unit 3F. For example, when the heating request vehicle data indicating the unmanned vehicle 2 that has output the heating request is displayed on the display device 41, the administrator looks at the display device 41 and operates the input device 42 so that the heating command is transmitted to the unmanned vehicle 2 that has output the heating request. The management determination unit 3E can determine that the heating process is necessary based on the input data acquired by the input data acquisition unit 3F. In this way, the management determination unit 3E can determine whether the heating process is necessary based on an intention of the administrator.

The operating status data acquisition unit 3G acquires the operating status data of another vehicle operating on the work site. As described above, the other vehicle includes at least one of the other unmanned vehicle 2, the loading machine 7, and the manned vehicle. The operating status data of the other vehicle includes at least one of a position of the other vehicle, a distance between the unmanned vehicle 2 and the other vehicle, and a traveling state of the other vehicle. The operating status data acquisition unit 3G acquires the operating status data of the other vehicle via the communication system 4.

The management determination unit 3E determines whether or not to stop the unmanned vehicle 2 at a specific position on the work site for the heating process of the hydraulic oil based on the operating status data of the other vehicle acquired by the operating status data acquisition unit 3G. The unmanned vehicle 2 executes the heating process in a stopped state. When there is the other vehicle near the unmanned vehicle 2, if the unmanned vehicle 2 stops for the heating process, it may hinder travel of the other vehicle. On the other hand, when there is no other vehicle near the unmanned vehicle 2, it is highly possible that the unmanned vehicle 2 will not have any problem even if it is stopped. The management determination unit 3E determines whether the unmanned vehicle 2 may stop based on the operating status data of the other vehicle. The management determination unit 3E determines whether the unmanned vehicle 2 may stop based on the operating status data of the other vehicle in order to suppress reduction in productivity at the work site.

The travel course data generator 3H generates the travel course data including the travel course Cr. The travel course Cr indicates the target travel route of the unmanned vehicle 2. In addition, the travel course data includes the target travel speed and the target travel direction at each of the plurality of course points CP set at intervals in the travel course. Each of the plurality of course points CP indicates the target position of the unmanned vehicle 2. The travel course Cr is defined by the line connecting the plurality of course points CP. The travel course data generator 3H outputs the travel course data generated to the management transmitter 3B. The management transmitter 3B transmits the travel course data to the control device 30 of the unmanned vehicle 2.

Further, the travel course data generator 3H changes the travel course data so as to move the unmanned vehicle 2 to the specific position on the work site when the heating command is output from the heating command unit 3C. As described above, the unmanned vehicle 2 executes the heating process in the stopped state. For example, if the unmanned vehicle 2 stops on the travel path HL for the heating process, there is a high possibility that it may hinder the travel of the other vehicle. In the present disclosure, the specific position suitable for executing the heating process is set on the work site. As the specific position, for example, a place that does not hinder the travel of the other vehicle such as a shoulder of the travel path HL or a parking lot is exemplified. When the heating command is output from the heating command unit 3C to the specific unmanned vehicle 2, the travel course data generator 3H changes the travel course data so that the unmanned vehicle 2, to which the heating command is output, moves to the specific position on the work site and then stops. The changed travel course data is transmitted from the management transmitter 3B to the control device 30 of the unmanned vehicle 2.

The heating canceler 3I outputs a heating stop command for stopping the heating process to the unmanned vehicle 2 that is executing the heating process.

The heating canceler 3I outputs the heating stop command based on the operating status data of the other vehicle acquired by the operating status data acquisition unit 3G. For example, when the unmanned vehicle 2 is stopped for the heating process on the way to the loading area LPA, or when the other unmanned vehicle 2 is stopped due to, for example, a presence of an obstacle, there is no unmanned vehicle 2 heading for the loading area LPA, or the number of the unmanned vehicles is reduced. In such a case, the heating canceler 3I interrupts the heating process of the unmanned vehicle 2 that is executing the heating process based on the operating status data of the other unmanned vehicle 2, and starts the travel of the unmanned vehicle 2. The unmanned vehicle 2 travels toward the loading area LPA. Thus, the reduction in the productivity at the work site is suppressed.

Note that the heating canceler 3I may output the heating stop command based on the input data generated by the input device 42. The administrator can know the operating status data based on the position data of the plurality of unmanned vehicles 2 displayed on the display device 41. When the administrator looks at the display device 41 and determines that the other unmanned vehicle 2 has stopped due to, for example, the presence of the obstacle, the administrator can operate the input device 42 in order to interrupt the heating process of the unmanned vehicle 2 that is stopped for the heating process and start the travel of the unmanned vehicle 2.

The specific position determination unit 3J determines the specific position at which the unmanned vehicle 2 is stopped for the heating process at the work site. As described above, the heating process is executed in a state where the unmanned vehicle 2 is stopped at the specific position suitable for executing the heating process. The specific position determination unit 3J determines the specific position based on the operating status data of the other vehicle. The specific position determination unit 37 determines the specific position based on the operating status data of the other vehicle so as not to hinder the travel of the other vehicle.

The control device 30 includes a vehicle transmitter 31, a vehicle receiver 32, a temperature data acquisition unit 33, a determination unit 34, a heating processor 35, a travel course data acquisition unit 36, and a travel command unit 37.

The vehicle transmitter 31 transmits data to the management device 3 via the communication system 4. Further, the vehicle transmitter 31 transmits data to another vehicle via the communication system 4.

The vehicle transmitter 31 transmits temperature data indicating the temperature of the hydraulic oil to be supplied to the steering cylinder 13 detected by the temperature sensor 17 to the management device 3.

Further, the vehicle transmitter 31 transmits a heating request for the hydraulic oil to the management device 3 based on the temperature of the hydraulic oil to be supplied to the steering cylinder 13.

The vehicle receiver 32 receives the data transmitted from the control device 30 via the communication system 4. Further, the vehicle receiver 32 receives the data transmitted from the other vehicle via the communication system 4.

The vehicle receiver 32 receives the heating command for the hydraulic oil generated in the management device 3 based on the heating request from the management device 3.

The temperature data acquisition unit 33 acquires the temperature data indicating the temperature of the hydraulic oil to be supplied to the steering cylinder 13 detected by the temperature sensor 17.

The determination unit 34 determines whether or not to output the heating request for the hydraulic oil based on the temperature of the hydraulic oil acquired by the temperature data acquisition unit 33. When the determination unit 34 compares a predetermined temperature threshold with the temperature of the hydraulic oil detected by the temperature sensor 17, and determines that the temperature of the hydraulic oil detected by the temperature sensor 17 is equal to or lower than the temperature threshold, it outputs the heating request for the hydraulic oil.

The heating processor 35 executes the heating process of the hydraulic oil based on the heating command output from the management device 3. The heating processor 35 executes the heating process in the state where the unmanned vehicle 2 is stopped at the specific position.

The travel course data acquisition unit 36 acquires the travel course data of the unmanned vehicle 2 from the management device 3 via the vehicle receiver 32.

The travel command unit 37 controls the travel of the unmanned vehicle 2. After a specific position in which the heating process is executed is determined, the travel command unit 37 moves the unmanned vehicle 2 to the specific position, and then stops the unmanned vehicle 2. The heating processor 35 executes the heating process after the unmanned vehicle 2 stops at the specific position on the work site.

As described above, the travel course data generator 3H changes the travel course data so as to move the unmanned vehicle 2 to the specific position on the work site when the heating command is output from the heating command unit 3C. The travel command unit 37 controls the travel so that the unmanned vehicle 2 travels according to the travel course data before the change when the heating command is not output. The travel command unit 37 controls the travel so that the unmanned vehicle 2 travels according to the changed travel course data when the heating command is output.

[Heating Process]

Figure 5:
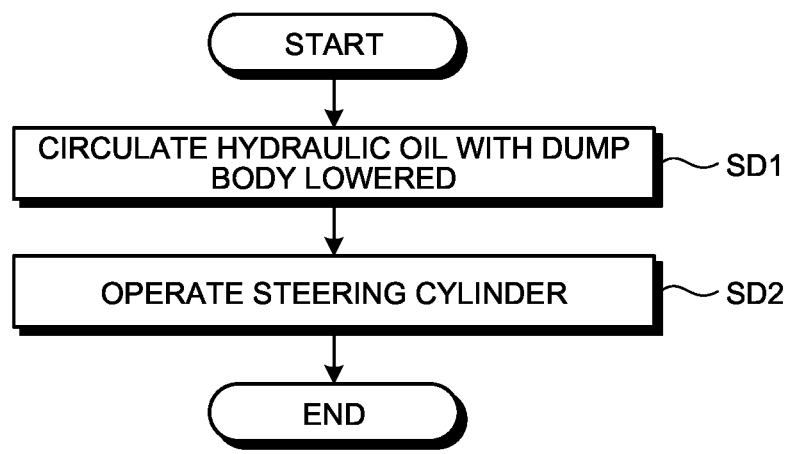
FIG. 5 is a flowchart illustrating an example of a method for heating hydraulic oil according to the first embodiment.
Figure 6:
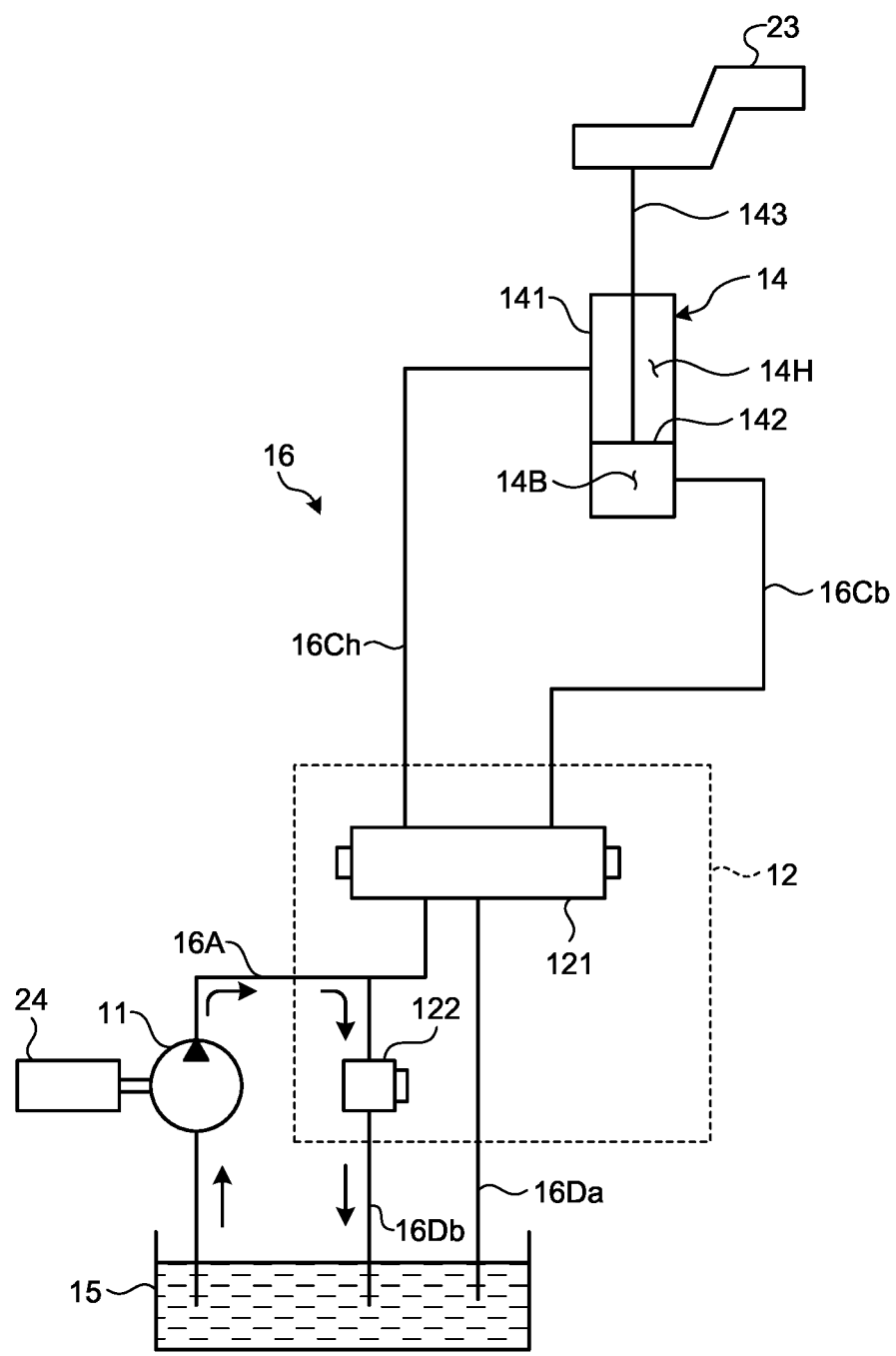
FIG. 6 is a diagram for explaining the method for heating the hydraulic oil according to the first embodiment.

FIG. 5 is a flowchart illustrating an example of the heating process of the hydraulic oil according to the present embodiment. FIG. 6 is a diagram for explaining the heating process of the hydraulic oil according to the present embodiment.

The heating process is executed with the unmanned vehicle 2 stopped. In a state where the rotation of the wheels 27 of the unmanned vehicle 2 is stopped, the heating processor 35 circulates the hydraulic oil at least in a part of the hydraulic circuit 16 through which the hydraulic oil to be supplied to the hoist cylinder 14 flows. In the present embodiment, the heating processor 35 discharges the hydraulic oil from the hydraulic pump 11 in a state where the dump body 23 is lowered, and circulates the hydraulic oil at least in the part of the hydraulic circuit 16 including the flow path 16C. The hydraulic oil flows at least in the part of the hydraulic circuit 16 including the flow path 16C.

As illustrated in FIG. 6, the hoist cylinder 14 includes a cylinder tube 141 having a bottom, a piston 142 that divides an internal space of the cylinder tube 141 into a bottom chamber 14B and a head chamber 14H, and a rod 143 connected to the piston 142.

A flow path 16Cb is connected to the bottom chamber 14B. A flow path 16Ch is connected to the head chamber 14H. The valve device 12 has a flow control valve 121 (second flow control valve) connected to the flow path 16Cb and the flow path 16Ch, and a relief valve 122. The flow path 16A is connected to the hydraulic pump 11. A flow path 16Da is connected to the flow control valve 121. A flow path 16Db is connected to the flow path 16A. The relief valve 122 is disposed in the flow path 16*db*.

The flow control valve 121 operates based on a control command from the heating processor 35. The flow control valve 121 includes a directional control valve. The heating processor 35 controls the flow control valve 121 so that the hydraulic oil discharged from the hydraulic pump 11 is supplied to one of the bottom chamber 14B and the head chamber 14H.

The hydraulic oil discharged from the hydraulic pump 11 is supplied to the bottom chamber 14B via the flow path 16A, the flow control valve 121, and the flow path 16Cb. When the hydraulic oil is supplied to the bottom chamber 14B, the hoist cylinder 14 is extended, the dump body 23 is raised, and a dump operation is performed.

Further, the hydraulic oil discharged from the hydraulic pump 11 is supplied to the head chamber 14H via the flow path 16A, the flow control valve 121, and the flow path 16Ch. When the hydraulic oil is supplied to the head chamber 14H, the hoist cylinder 14 is contracted and the dump body 23 is lowered.

In the present embodiment, the heating processor 35 controls an operation of the hydraulic pump 11 and an operation of the valve device 12. When the temperature of the hydraulic oil is raised, the heating processor 35 continues to operate the hydraulic pump 11 with the dump body 23 lowered. A state in which the dump body 23 is lowered includes a state in which the piston 142 has moved to a bottom end (stroke end) of the cylinder tube 141. When the hydraulic pump 11 continues to operate with the dump body 23 lowered, the hydraulic oil flows through the hoist cylinder 14 and a pressure in the head chamber 14H is increased. When the pressure in the head chamber 14H is increased not less than a threshold value, the relief valve 122 is opened. Thus, the hydraulic oil discharged from the hydraulic pump 11 and flowing through the flow path 16A is returned to the hydraulic oil tank 15 via the relief valve 122 and the flow path 16Db. That is, when the hydraulic pump 11 continues to operate with the dump body 23 lowered, the hydraulic oil discharged from the hydraulic pump 11 circulates in a partial circulation path of the hydraulic circuit 16 including the flow path 16A, the relief valve 122, the flow path 16Db, and the hydraulic oil tank 15 (Step SD1).

As the hydraulic oil flows in a circulating manner, the temperature of the hydraulic oil is raised due to frictional resistance with the flow path. Thus, the temperature of the hydraulic oil contained in the hydraulic oil tank 15 is raised.

After the hydraulic oil is circulated in at least a part of the hydraulic circuit 16 including the flow path 16A through which the hydraulic oil supplied to the hoist cylinder 14 flows to raise the temperature of the hydraulic oil in the hydraulic oil tank 15, the heating processor 35 controls the valve device 12 so that the steering cylinder 13 operates with the unmanned vehicle 2 stopped (Step SD2).

As the steering cylinder 13 operates with the unmanned vehicle 2 stopped, directions of the tires are switched while the tires mounted on the front wheels 27F are in contact with the ground. That is, a stationary steering is performed. As the hydraulic oil is supplied from the hydraulic pump 11 to the steering cylinder 13 so that the steering cylinder 13 operates, the hydraulic oil having a raised temperature in the hydraulic oil tank 15 is supplied to the steering cylinder 13.

The unmanned vehicle 2 starts traveling in a state where the hydraulic oil having the raised temperature is supplied to the steering cylinder 13. Since the hydraulic oil having the raised temperature is supplied to the steering cylinder 13, decrease of steering responsiveness of the steering device 26 is suppressed.

[Control Method]

Figure 7:
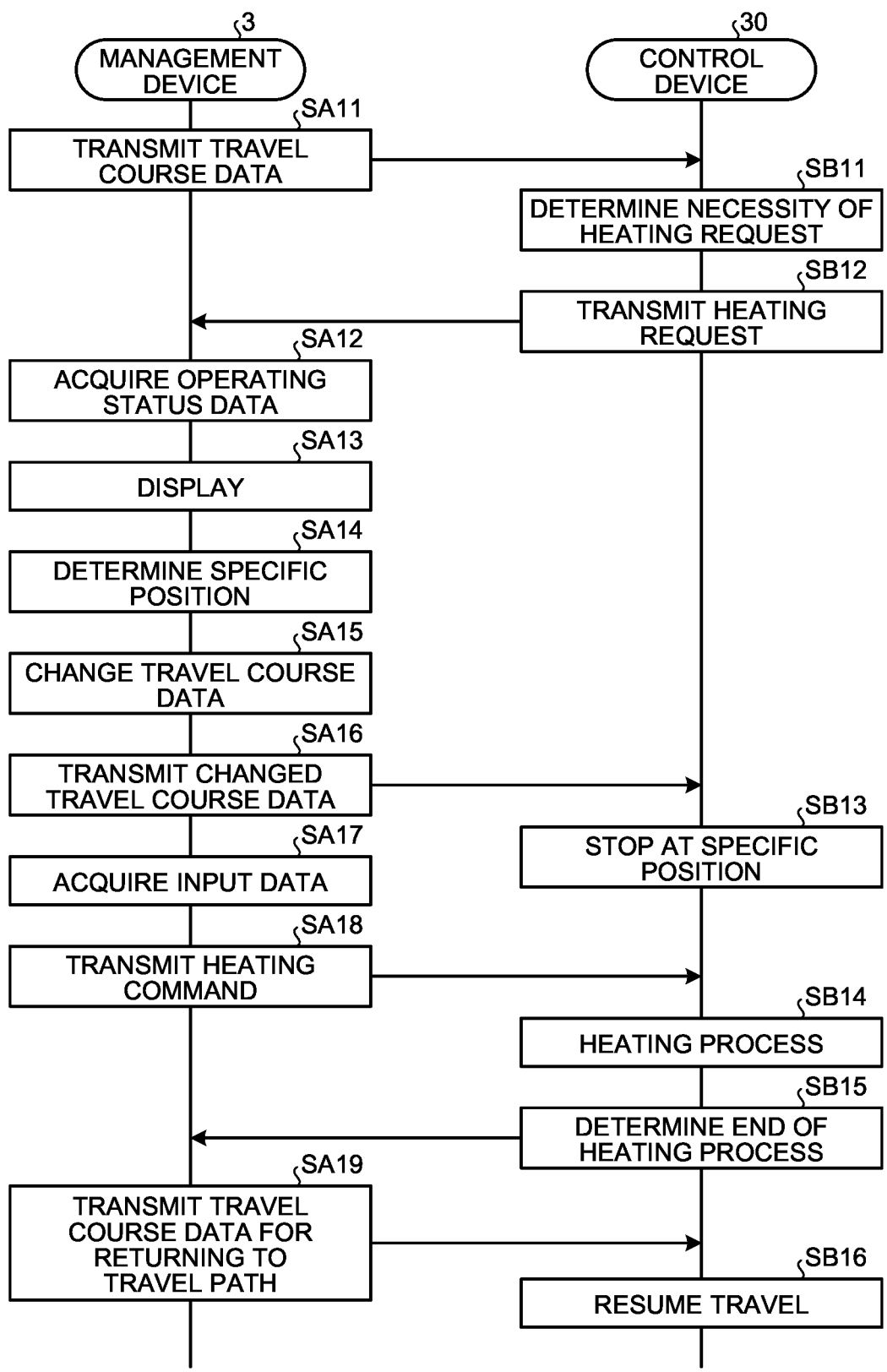
FIG. 7 is a flowchart illustrating an example of an unmanned vehicle control method according to the first embodiment.

FIG. 7 is a flowchart illustrating an example of the control method of the unmanned vehicle 2 according to the present embodiment. In the management device 3, the travel course data generator 3H generates the travel course data. The management transmitter 3B transmits the generated travel course data to the control device 30 of the unmanned vehicle 2 via the communication system 4 (Step SA11).

In the control device 30, the travel course data acquisition unit 36 acquires the travel course data. The travel command unit 37 controls the traveling device 21 so that the unmanned vehicle 2 travels according to the travel course Cr based on the travel course data.

When the unmanned vehicle 2 is traveling, the temperature of the hydraulic oil is detected by the temperature sensor 17. The temperature of the hydraulic oil is acquired by the temperature data acquisition unit 33. The determination unit 34 determines whether or not to output the heating request for the hydraulic oil based on the temperature of the hydraulic oil (Step SB11).

When it is determined in Step SB11 that the heating request for the hydraulic oil is not output, the unmanned vehicle 2 continues traveling based on the travel course data. When it is determined in Step SB11 that the heating request for hydraulic oil is output, the vehicle transmitter 31 transmits the heating request to the management device 3 (Step SB12).

The operating status data acquisition unit 3G acquires the operating status data of the other vehicle (Step SA12).

The display controller 3D causes the display device 41 to display the heating request vehicle data indicating the unmanned vehicle 2 that has output the heating request and the operating status data of the other vehicle (Step SA13).

When the administrator looks at the display device 41 and recognizes that the hydraulic oil needs to be heated, the administrator determines a specific position to stop the unmanned vehicle 2 for the heating process based on the operating status data of the other vehicle. The administrator determines the specific position so that the travel of the other unmanned vehicle 2 is not hindered (Step SA14).

The administrator operates the input device 42 to input the determined specific position to the management device 3. The input data generated by operating the input device 42 is acquired by the input data acquisition unit 3F, and the travel course data generator 3H changes the travel course data so that the unmanned vehicle 2 moves to the specific position on the work site (Step SA15).

The travel course data generator 3H transmits the changed travel course data to the control device 30 of the unmanned vehicle 2 via the management transmitter 3B (Step SA16).

The travel course data acquisition unit 36 acquires the changed travel course data. The travel command unit 37 controls the travel of the unmanned vehicle 2 so that the unmanned vehicle 2 travels according to the changed travel course data. The unmanned vehicle 2 travels to the specific position according to the changed travel course data, and then stops at the specific position (Step SB13).

The administrator looks at the display device 41 and confirms that the unmanned vehicle 2 has stopped at the specific position, and then operates the input device 42 so that the heating command is output. The input data generated by operating the input device 42 is acquired by the input data acquisition unit 3F (Step SA17).

The heating command unit 3C outputs the heating command based on the input data. The heating command unit 3C transmits the heating command to the control device 30 via the management transmitter 3B (Step SA18).

The heating processor 35 receives the heating command via the vehicle receiver 32.

The heating processor 35 executes the heating process in the state where the unmanned vehicle 2 is stopped at the specific position. The heating processor 35 executes the heating process described with reference to FIGS. 5 and 6 (Step SB14).

As the heating process is executed, the temperature of the hydraulic oil is raised. The determination unit 34 determines whether or not to end the heating process based on the temperature of the hydraulic oil detected by the temperature sensor 17 (Step SB15).

When the determination unit 34 determines that the temperature of the hydraulic oil has been raised to a predetermined specified temperature, it determines to end the heating process.

Heating process end data indicating an end of the heating process is transmitted from the vehicle transmitter 31 to the management device 3. The travel course data generator 3H generates the travel course data for returning the unmanned vehicle 2 stopped at the specific position to the travel path HL. The travel course data generator 3H transmits the travel course data for returning the unmanned vehicle 2 to the travel path HL to the control device 30 via the management transmitter 3B (Step SA19).

After the heating process ends, a travel controller 39 resumes the travel of the unmanned vehicle 2 (Step SB16). The travel command unit 37 travels the unmanned vehicle 2 based on the travel course data for returning the unmanned vehicle 2 to the travel path HL. Since the hydraulic oil having the raised temperature is supplied to the steering cylinder 13, decrease of steering responsiveness of the steering device 26 is suppressed.

Note that there is the unmanned vehicle 2 that is stopped at the work site. For example, there is the unmanned vehicle 2 stopped at an entrance of the loading area LPA or the parking lot. In the unmanned vehicle 2 that is stopped, the temperature of the hydraulic oil is detected by the temperature sensor 17. The temperature of the hydraulic oil is acquired by the temperature data acquisition unit 33. The determination unit 34 determines whether or not to output the heating request for the hydraulic oil based on the temperature of the hydraulic oil. When it is determined that the heating request for the hydraulic oil is to be output, the vehicle transmitter 31 transmits the heating request to the management device 3.

The display controller 3D causes the display device 41 to display heating request vehicle data indicating the unmanned vehicle 2 that has output the heating request. When the administrator looks at the display device 41 and recognizes that the hydraulic oil of the stopped unmanned vehicle 2 needs to be heated, the administrator operates the input device 42 so that the heating command is output. The input data generated by operating the input device 42 is acquired by the input data acquisition unit 3F. The heating command unit 3C outputs the heating command based on the input data. The heating command unit 3C transmits the heating command to the control device 30 via the management transmitter 3B. The heating processor 35 of the stopped unmanned vehicle 2 receives the heating command via the vehicle receiver 32. The heating processor 35 executes the heating process.

[Effects]

As described above, according to the present embodiment, the heating process of the hydraulic oil is executed based on the heating command transmitted from the management device 3. Thus, for example, the administrator can execute the heating process of any unmanned vehicle 2 at any timing.

Second Embodiment

A second embodiment will be described. In the following description, the same or similar components as those in the above-described embodiment are denoted by the same reference numerals, and description thereof will be simplified or omitted.

Figure 8:
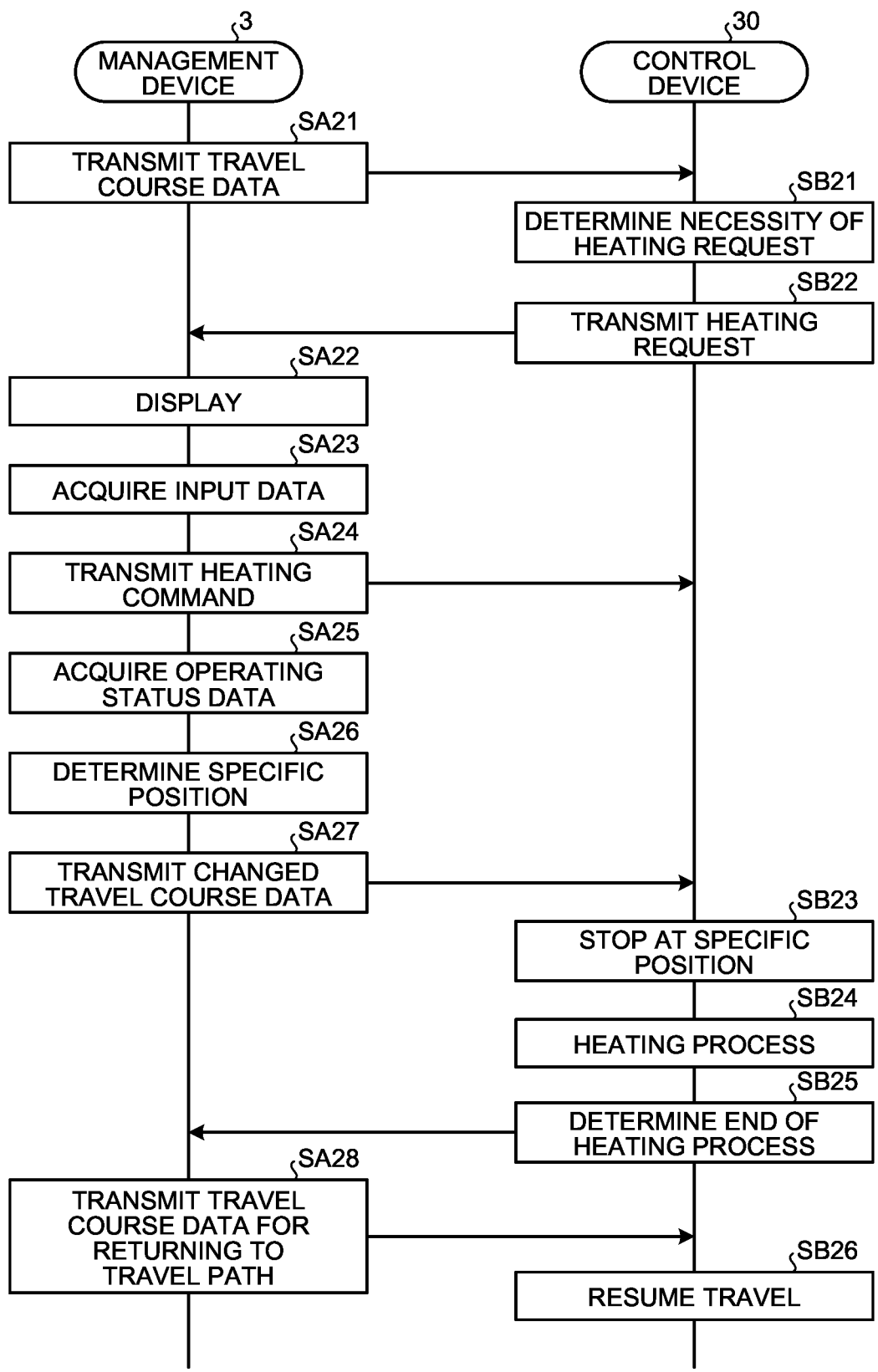
FIG. 8 is a flowchart illustrating an example of an unmanned vehicle control method according to a second embodiment.

FIG. 8 is a flowchart illustrating an example of a control method of the unmanned vehicle 2 according to the present embodiment. In the management device 3, the travel course data generator 3H generates the travel course data. The management transmitter 3B transmits the generated travel course data to the control device 30 of the unmanned vehicle 2 via the communication system 4 (Step SA21).

In the control device 30, the travel course data acquisition unit 36 acquires the travel course data. The travel command unit 37 controls the traveling device 21 so that the unmanned vehicle 2 travels according to the travel course Cr based on the travel course data.

When the unmanned vehicle 2 is traveling, the temperature of the hydraulic oil is detected by the temperature sensor 17. The temperature data of the hydraulic oil is acquired by the temperature data acquisition unit 33. The determination unit 34 determines whether or not to output the heating request for the hydraulic oil based on the temperature data of the hydraulic oil (Step SB21).

When it is determined in Step SB21 that the heating request for the hydraulic oil is not to be output, the unmanned vehicle 2 continues traveling based on the travel course data. When it is determined in Step SB21 that the heating request for the hydraulic oil is to be output, the vehicle transmitter 31 transmits the heating request to the management device 3 (Step SB22).

The display controller 3D causes the display device 41 to display the heating request vehicle data indicating the unmanned vehicle 2 that has output the heating request (Step SA22).

When the administrator looks at the display device 41 and recognizes that the hydraulic oil needs to be heated, the administrator operates the input device 42 so that the heating command is output. The input data generated by operating the input device 42 is acquired by the input data acquisition unit 3F (Step SA23).

The heating command unit 3C outputs the heating command based on the input data. The heating command unit 3C transmits the heating command to the control device 30 via the management transmitter 3B (Step SA24).

The heating processor 35 receives the heating command via the vehicle receiver 32.

The operating status data acquisition unit 3G acquires the operating status data of the other vehicle (Step SA25).

The specific position determination unit 3J determines the specific position in which the heating process is executed based on the operating status data of the other vehicle. The specific position determination unit 3J determines the specific position so that the travel of the other unmanned vehicle 2 is not hindered (Step SA26).

The travel course data generator 3H changes the travel course data so that when the heating command is output from the heating command unit 3C, the unmanned vehicle 2 is moved to the specific position on the work site and then stopped. The travel course data generator 3H transmits the changed travel course data to the control device 30 of the unmanned vehicle 2 via the management transmitter 3B (Step SA27).

The travel course data acquisition unit 36 acquires the changed travel course data. The travel command unit 37 controls the travel of the unmanned vehicle 2 so that the unmanned vehicle 2 travels according to the changed travel course data. The unmanned vehicle 2 travels to the specific position and stops according to the changed travel course data (Step SB23).

The heating processor 35 executes the heating process in the state where the unmanned vehicle 2 is stopped at the specific position. The heating processor 35 executes the heating process described with reference to FIGS. 5 and 6 (Step SB24).

As the heating process is executed, the temperature of the hydraulic oil is raised. The determination unit 34 determines whether or not to end the heating process based on the temperature of the hydraulic oil detected by the temperature sensor 17 (Step SB25).

When the determination unit 34 determines that the temperature of the hydraulic oil has been raised to a predetermined specified temperature, it determines to end the heating process.

Heating process end data indicating an end of the heating process is transmitted from the vehicle transmitter 31 to the management device 3. The travel course data generator 3H generates the travel course data for returning the unmanned vehicle 2 stopped at the specific position to the travel path HL. The travel course data generator 3H transmits the travel course data for returning the unmanned vehicle 2 to the travel path HL to the control device 30 via the management transmitter 3B (Step SA28).

After the heating process ends, the travel controller 39 resumes the travel of the unmanned vehicle 2 (Step SB26). The travel command unit 37 travels the unmanned vehicle 2 based on the travel course data for returning the unmanned vehicle 2 to the travel path HL. Since the hydraulic oil having the raised temperature is supplied to the steering cylinder 13, decrease of steering responsiveness of the steering device 26 is suppressed.

As described above, according to the present embodiment, the specific position is determined by the management device 3. The heating process of the hydraulic oil is executed based on the heating command transmitted from the control device 3. Thus, the heating process of any unmanned vehicle 2 is executed at any timing. Since the hydraulic oil having the raised temperature is supplied to the steering cylinder 13, decrease of steering responsiveness of the steering device 26 is suppressed.

Note that in the present embodiment, the heating request vehicle data indicating the unmanned vehicle 2 that has output the heating request is displayed on the display device 41, and the administrator confirms the display device 41 and operates the input device 42 so that the heating command is output. The heating request vehicle data may not be displayed on the display device 41. For example, the temperature or the waiting time of the hydraulic oil of the unmanned vehicle 2 may only be displayed. The administrator confirms the temperature or the waiting time of the hydraulic oil displayed on the display device 41, and when it recognizes that the hydraulic oil needs to be heated, it may operate the input device 42 so that the heating command is output.

Third Embodiment

The third embodiment will be described. In the following description, the same or similar components as those in the above-described embodiment are denoted by the same reference numerals, and description thereof will be simplified or omitted.

Figure 9:
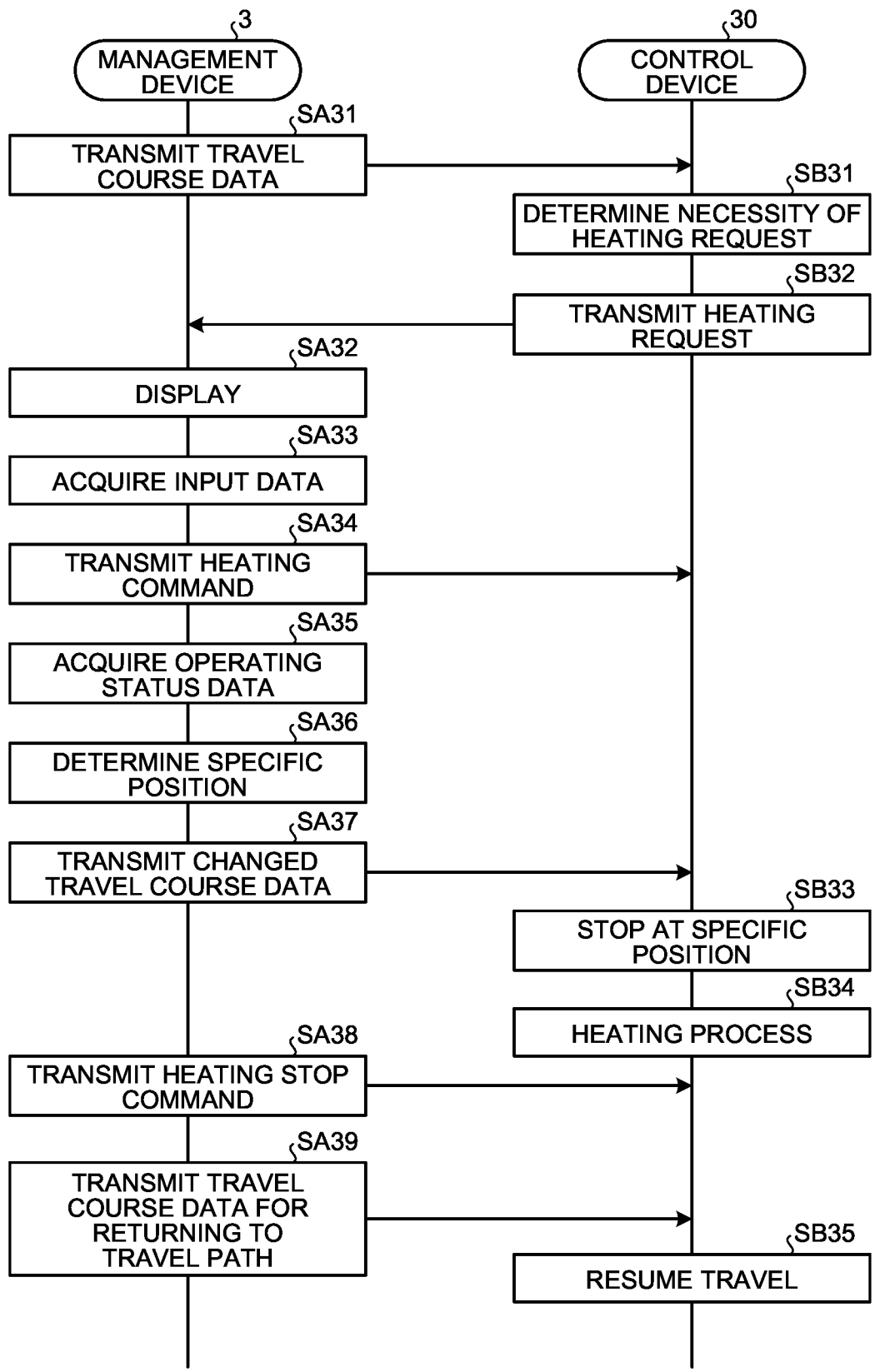
FIG. 9 is a flowchart illustrating an example of an unmanned vehicle control method according to a third embodiment.

FIG. 9 is a flowchart illustrating an example of a control method of the unmanned vehicle 2 according to the present embodiment. The management transmitter 3B transmits the travel course data to the control device 30 of the unmanned vehicle 2 via the communication system 4 (Step SA31).

The travel command unit 37 controls the traveling device 21 so that the unmanned vehicle 2 travels according to the travel course Cr based on the travel course data.

The determination unit 34 determines whether or not to output the heating request for the hydraulic oil based on the temperature of the hydraulic oil (Step SB31).

When it is determined in Step SB31 that the heating request for the hydraulic oil is to be output, the vehicle transmitter 31 transmits the heating request to the management device 3 (Step SB32).

The display controller 3D causes the display device 41 to display the heating request vehicle data indicating the unmanned vehicle 2 that has output the heating request (Step SA32).

When the administrator looks at the display device 41 and recognizes that the hydraulic oil needs to be heated, the administrator operates the input device 42 so that the heating command is output. The input data generated by operating the input device 42 is acquired by the input data acquisition unit 3F (Step SA33).

The heating command unit 3C outputs the heating command based on the input data. The heating command unit 3C transmits the heating command to the control device 30 via the management transmitter 3B (Step SA34).

The heating processor 35 receives the heating command via the vehicle receiver 32.

The operating status data acquisition unit 3G acquires the operating status data of the other vehicle (Step SA35).

The specific position determination unit 3J determines the specific position in which the heating process is executed based on the operating status data of the other vehicle (Step SA36).

The travel course data generator 3H changes the travel course data so that when the heating command is output from the heating command unit 3C, the unmanned vehicle 2 is moved to the specific position on the work site and then stopped. The travel course data generator 3H transmits the changed travel course data to the control device 30 of the unmanned vehicle 2 via the management transmitter 3B (Step SA37).

The travel course data acquisition unit 36 acquires the changed travel course data. The travel command unit 37 controls the travel of the unmanned vehicle 2 so that the unmanned vehicle 2 travels according to the changed travel course data. The unmanned vehicle 2 travels to the specific position and stops according to the changed travel course data (Step SB33).

The heating processor 35 executes the heating process described with reference to FIGS. 5 and 6 in a state where the unmanned vehicle 2 is stopped at the specific position (Step SB34).

The heating canceler 3I outputs the heating stop command when it is determined to resume the travel of the unmanned vehicle 2 stopped for the heating process based on the operating status data of the other vehicle (Step SA38).

The travel course data generator 3H generates the travel course data for returning the unmanned vehicle 2 stopped at the specific position to the travel path HL, and transmits the travel course data to the control device 30 via the management transmitter 3B (Step SA39).

The travel command unit 37 resumes the travel of the unmanned vehicle 2 based on the heating stop command. The travel command unit 37 resumes the travel of the unmanned vehicle 2 based on the travel course data for returning the unmanned vehicle 2 to the travel path HL (Step SB35).

As described above, according to the present embodiment, the heating canceler 3I can interrupt the heating process for the unmanned vehicle 2 as needed. For example, when the other unmanned vehicle 2 is stopped due to the presence of the obstacle, a situation may occur where it is preferable to interrupt the heating process of the unmanned vehicle 2 that is executing the heating process and to resume the travel of the unmanned vehicle 2 from the viewpoint of suppressing the reduction in the productivity at the work site. According to the present embodiment, the heating canceler 3I can interrupt the heating process of the unmanned vehicle 2 as needed, so that the reduction in productivity at the work site is suppressed.

<Computer System>

Figure 10:
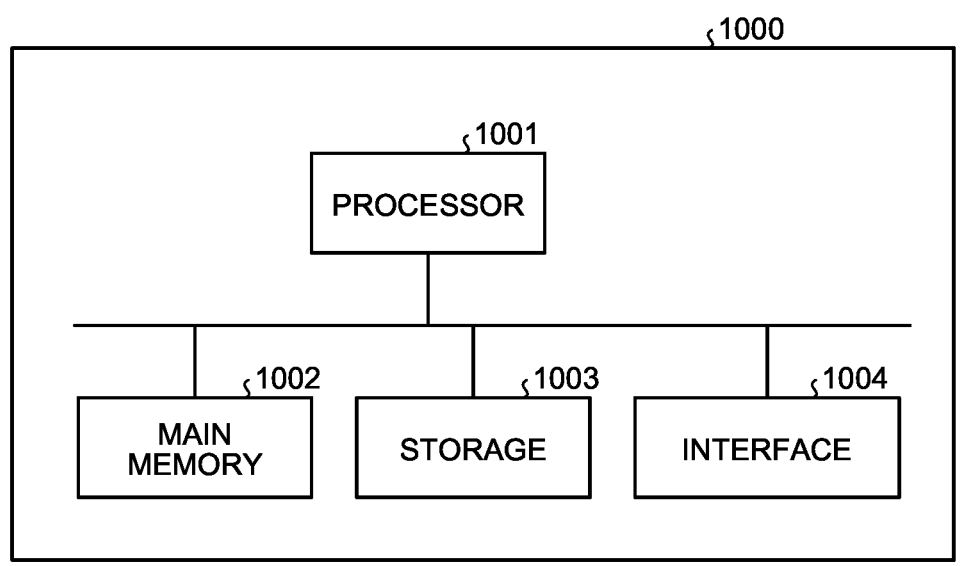
FIG. 10 is a block diagram illustrating an example of a computer system.

FIG. 10 is a block diagram illustrating an example of a computer system 1000. Each of the management device 3 and the control device 30 described above includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. A function of the management device 3 and a function of the control device 30 described above are stored in the storage 1003 as a program. The processor 1001 reads the program from the storage 1003, expands it into the main memory 1002, and executes the above-described process according to the program. Note that the program may be distributed to the computer system 1000 via the network.

Other Embodiments

In the above-described embodiments, the temperature of the hydraulic oil is detected by the temperature sensor 17 as the hydraulic oil data, and the heating request for the hydraulic oil is output based on the temperature of the hydraulic oil. If a state in which the flow of the hydraulic oil is stopped is continued in the hydraulic circuit 16 and the hydraulic actuators (13, 14), the temperature of the hydraulic oil is lowered. Therefore, the heating request for the hydraulic oil may be output based on the waiting time indicating the time while the flow of the hydraulic oil is stopped as the hydraulic oil data. The determination unit 34 determines whether or not to output the heating request for the hydraulic oil based on the waiting time while the flow of the hydraulic oil is stopped. The determination unit 34 compares a predetermined time threshold value with the time while the flow of the hydraulic oil is stopped, and may output the heating request for the hydraulic oil when it determines that the time while the flow of the hydraulic oil is stopped is equal to or less than the time threshold value.

In the above-described embodiments, the plurality of unmanned vehicles 2 operate at the work site. The management device 3 can acquire an operating status (a vehicle allocation status) of each of the plurality of unmanned vehicles 2. For example, when the loading work for a preceding unmanned vehicle 2 is executed in the loading area LPA, the unmanned vehicle 2 for which the loading work is executed next may stop at the entrance of the loading area LPA and stand by. When the heating request is output from the unmanned vehicle 2 stopped at the entrance of the loading area LPA, the management device 3 may output the heating command to the control device 30 of the next unmanned vehicle 2 so that the heating process is executed at the entrance of the loading area LPA. The management device 3 can grasp a situation where the plurality of unmanned vehicles 2 are waiting at the entrance of the loading area LPA. When the management device 3 predicts that the waiting time of the unmanned vehicle 2 at the entrance of the loading area LPA is long, the management device 3 may execute the heating process.

Note that in the above-described embodiments, at least a part of the function of the control device 30 of the unmanned vehicle 2 may be provided in the management device 3, or at least a part of the function of the management device 3 may be provided in the control device 30.

Note that in the above-described embodiments, the travel course data is generated in the management device 3, and the unmanned vehicle 2 travels according to the travel course data transmitted from the management device 3. The control device 30 of the unmanned vehicle 2 may generate travel course data. That is, the control device 30 may have the travel course data generator 3H. Further, each of the management device 3 and the control device 30 may have the travel course data generator 3H.

Note that in the above-described embodiments, the unmanned vehicle 2 is a dump truck which is a kind of transport vehicle. The unmanned vehicle 2 may be a work machine equipped with a working equipment, for example, such as an excavator or a bulldozer.

REFERENCE SIGNS LIST

1 CONTROL SYSTEM
2 UNMANNED VEHICLE
3 MANAGEMENT DEVICE
3A MANAGEMENT RECEIVER
3B MANAGEMENT TRANSMITTER
3C HEATING COMMAND UNIT
3D DISPLAY CONTROLLER
3E MANAGEMENT DETERMINATION UNIT
3F INPUT DATA ACQUISITION UNIT
3G OPERATING STATUS DATA ACQUISITION UNIT
3H TRAVEL COURSE DATA GENERATOR
3I HEATING CANCELER
3J SPECIFIC POSITION DETERMINATION UNIT
4 COMMUNICATION SYSTEM
5 CONTROL FACILITY
6 WIRELESS COMMUNICATION DEVICE
7 LOADING MACHINE
8 CRUSHER
10 HYDRAULIC SYSTEM
11 HYDRAULIC PUMP
12 VALVE DEVICE
13 STEERING CYLINDER (FIRST HYDRAULIC ACTUATOR)
13B BOTTOM CHAMBER
13H HEAD CHAMBER
13L STEERING CYLINDER
13R STEERING CYLINDER
14 HOIST CYLINDER (SECOND HYDRAULIC ACTUATOR)
14B BOTTOM CHAMBER
14H HEAD CHAMBER
15 HYDRAULIC OIL TANK
16 HYDRAULIC CIRCUIT
16A FLOW PATH
16B FLOW PATH
16Bb FLOW PATH
16Bh FLOW PATH
16C FLOW PATH
16Cb FLOW PATH
16Ch FLOW PATH
16D FLOW PATH
16Da FLOW PATH
16Db FLOW PATH
17 TEMPERATURE SENSOR
17A TEMPERATURE SENSOR
17B TEMPERATURE SENSOR
18 STEERING ANGLE SENSOR
21 TRAVELING DEVICE
22 VEHICLE BODY
23 DUMP BODY
24 DRIVE DEVICE
25 BRAKE DEVICE
26 STEERING DEVICE
27 WHEEL
27F FRONT WHEEL
27R REAR WHEEL
28 POSITION DETECTION DEVICE
29 WIRELESS COMMUNICATION DEVICE
30 CONTROL DEVICE
31 VEHICLE TRANSMITTER
32 VEHICLE RECEIVER
33 TEMPERATURE DATA ACQUISITION UNIT
34 DETERMINATION UNIT
35 HEATING PROCESSOR
36 TRAVEL COURSE DATA ACQUISITION UNIT
37 TRAVEL COMMAND UNIT
41 DISPLAY DEVICE
42 INPUT DEVICE
121 FLOW CONTROL VALVE
122 RELIEF VALVE
131 CYLINDER TUBE
132 PISTON
133 ROD
141 CYLINDER TUBE
142 PISTON
143 ROD
Cr TRAVEL COURSE
Cr1 TRAVEL COURSE
Cr2 TRAVEL COURSE
HL TRAVEL PATH
PA WORK AREA
DPA UNLOADING AREA
LPA LOADING AREA

The invention claimed is:

1. An unmanned vehicle control system comprising:
a temperature sensor to detect a temperature of hydraulic oil;
a determination processor unit that determines whether or not to output a heating request for a hydraulic oil based on hydraulic oil data supplied to a hydraulic actuator disposed in an unmanned vehicle and operated by the hydraulic oil;
a vehicle receiver that receives a heating command for the hydraulic oil generated based on the heating request;
a heating processor that executes a heating process of the hydraulic oil based on the heating command, and
a specific position determination processor unit that determines a specific position at which the unmanned vehicle is stopped in a work site,
wherein the heating processor executes the heating process in a state where the unmanned vehicle is stopped at the specific position.

2. The unmanned vehicle control system according to claim 1, wherein
the hydraulic oil data includes at least one of the temperature of the hydraulic oil and a waiting time indicating a time while a flow of the hydraulic oil is stopped.

3. The unmanned vehicle control system according to claim 1, wherein
the specific position determination processor unit determines the specific position based on operating status data of another vehicle operating at the work site.

4. The unmanned vehicle control system according to claim 1, further comprising:

a travel course data generator processor that generates travel course data including a target travel route of the unmanned vehicle, wherein the travel course data generator processor changes the travel course data such that the unmanned vehicle moves to the specific position when the heating command is output.

5. The unmanned vehicle control system according to claim 4, further comprising:

a travel command processor unit that controls travel of the unmanned vehicle, wherein the travel command processor unit controls such that when the heating command is not output, the unmanned vehicle travels according to the travel course data, and when the heating command is output, the unmanned vehicle travels according to the changed travel course data.

6. The unmanned vehicle control system according to claim 1, further comprising:

a management determination processor unit that determines whether or not to stop the unmanned vehicle at the specific position based on operating status data of another vehicle operating at the work site.

7. The unmanned vehicle control system according to claim 1, further comprising:

a heating canceler processor that outputs a heating stop command for stopping the heating process.

8. The unmanned vehicle control system according to claim 7, wherein the heating canceler outputs the heating stop command based on operating status data of another vehicle operating at the work site.

9. The unmanned vehicle control system according to claim 1, further comprising:

a display controller that causes a display device to display heating execution vehicle data indicating the unmanned vehicle in which the heating process is executed.

10. An unmanned vehicle control method comprising:

determining whether or not to output a heating request for a hydraulic oil based on hydraulic oil data supplied to a hydraulic actuator disposed in an unmanned vehicle and operated by the hydraulic oil;

receiving a heating command for the hydraulic oil generated based on the heating request;

executing a heating process of the hydraulic oil based on the heating command, determining a specific position at which the unmanned vehicle is stopped in a work site, wherein the heating processor executes the heating process in a state where the unmanned vehicle is stopped at the specific position.

* * * * *